United States Patent [19]

Teske et al.

[11] 3,908,477
[45] Sept. 30, 1975

[54] LINK CHAIN

[76] Inventors: Fritz Teske, Industriestrasse 28; Lothar Teske, Industriestrasse 30, both of Porz-Westhoven, Germany

[22] Filed: Oct. 11, 1974

[21] Appl. No.: 514,278

[52] U.S. Cl. .................. 74/251 R; 403/154; 403/315
[51] Int. Cl.² ............................................ F16C 11/04
[58] Field of Search ........... 403/154, 155, 319, 316, 403/324, 315, 355, 379, 157; 85/5 N, 5 CP, 7; 74/251 R, 251 C, 254

[56] References Cited
UNITED STATES PATENTS

| | | | |
|---|---|---|---|
| 542,952 | 7/1895 | Whiteley | 74/251 R |
| 764,246 | 7/1904 | Levalley | 74/251 R |
| 2,124,912 | 7/1938 | Ehmann | 85/7 X |
| 2,186,047 | 1/1940 | Stine | 403/319 X |
| 2,365,229 | 12/1944 | Vanderzee | 74/251 R |
| 2,539,630 | 1/1951 | Krueger et al. | 64/28 |
| 2,661,228 | 12/1953 | Wilson | 403/155 |
| 3,245,705 | 4/1966 | Fangman | 403/154 |

*Primary Examiner*—Andrew V. Kundrat
*Attorney, Agent, or Firm*—Spencer & Kaye

[57] ABSTRACT

In a chain composed of a plurality of links including at least one forked portion having two parallel extending fork members provided with respective coaxial bores, at least one bearing eye portion provided with a bore coaxial with the bores in the forked portion, and a chain bolt extending through the bores in the forked portions and the bearing eye portion to hold those portions together, the chain bolt being secured against axial displacement and rotation relative to the forked portion, the chain bolt is provided at one of its ends with a through hole transverse to the axis of the bolt, a recess is formed in the outer surface of the forked member adjacent the through hole, and a pin which is longer than the through hole is inserted therein and has its protruding portion engaging in the recess when the bolt is fully inserted, thereby to prevent rotation of the bolt relative to the forked portion.

7 Claims, 5 Drawing Figures

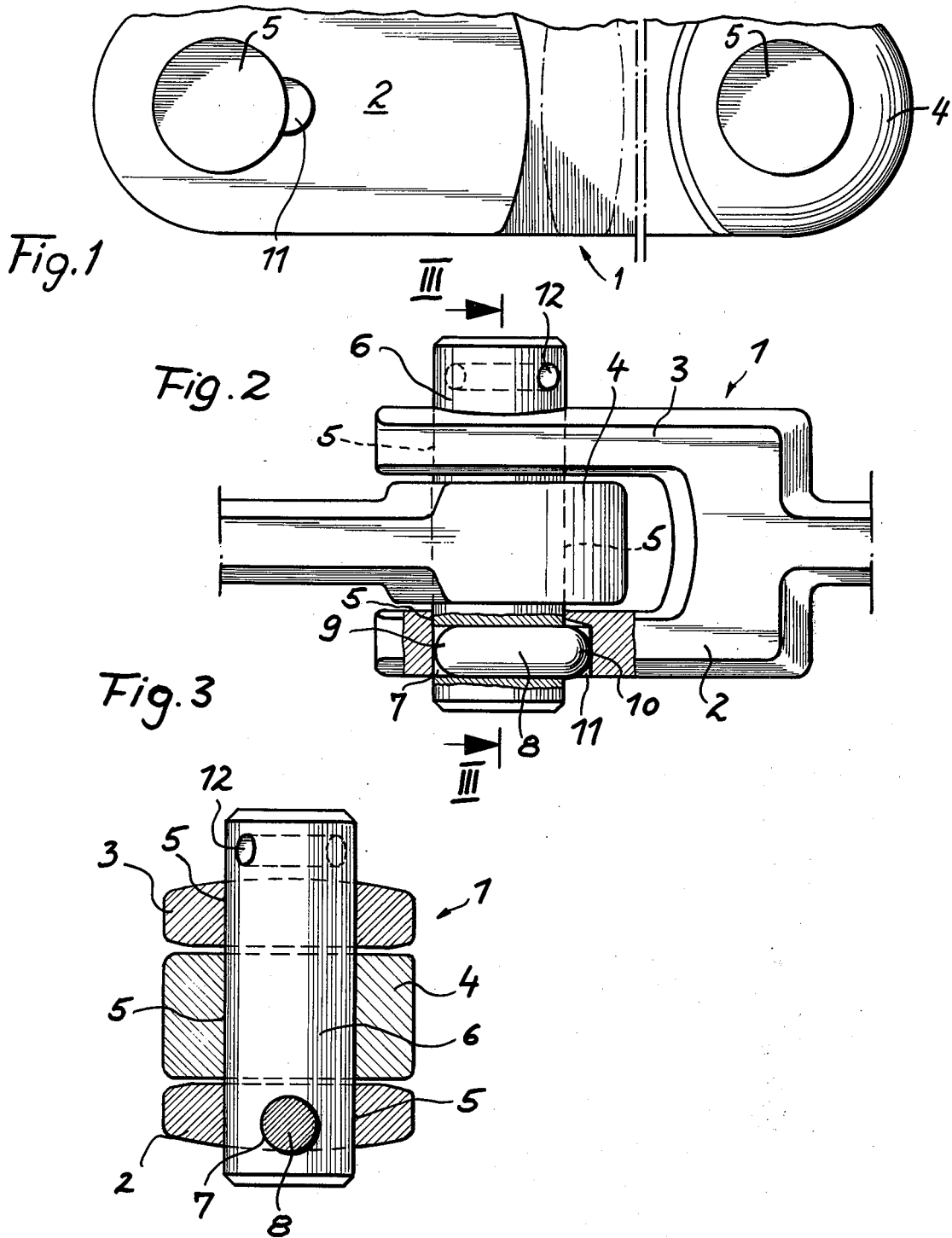

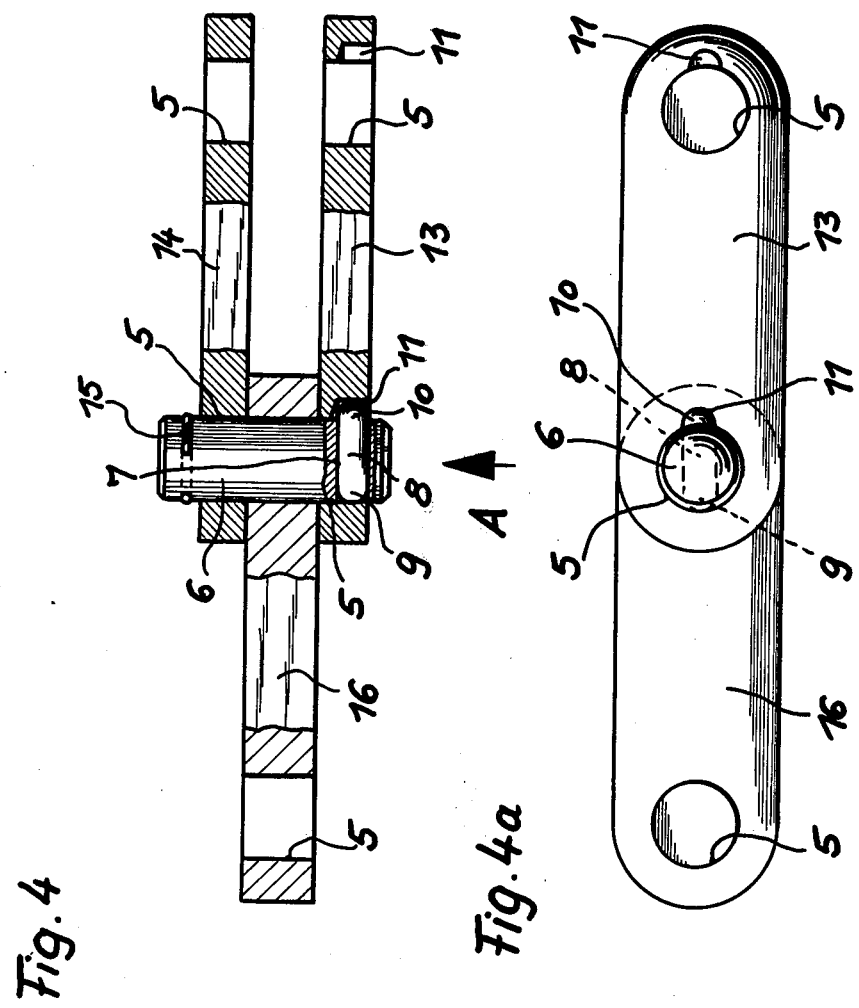

LINK CHAIN

BACKGROUND OF THE INVENTION

The present invention relates to a link chain, particularly a forked link chain each forked link of which has at one end, a forked portion composed of two tines, and at the other end is designed as an eye portion which engages between the tines of the fork of the adjacent link, two such links being joined by a chain bolt which is secured against rotation as well as against axial displacement in outer links or in the tines of the fork.

In order to secure the chain bolt in the outer links of a link chain against rotation and axial displacement it is known to provide the chain bolt at one end with an integral square head portion which engages into a conforming recess in the adjacent outer link and, at the other, with a transverse hole through which a cotter pin is removably inserted, which pin is supported at the outside of the other outer link.

Instead of a cotter pin, use may be made of a pin whose two end portions, which protrude from the transverse hole, are bent to rest on the bolt so that the chain bolt can be removed upon removal of the pin.

The production of the square head or the chain bolt and of the recess in the forked links to correspond to the chain bolt head is relatively complicated and expensive.

SUMMARY OF THE INVENTION

It is therefore an object of the present invention to substantially simplify, and to reduce the cost of, the mount for the chain bolts in a chain of the above-described type, where the bolt is secured against rotation and axial displacement.

This is accomplished, according to the present invention, by the provision of a link chain, with a respective bolt holding adjacent links together, each bolt having, at one end, a through hole which extends transversely to the bolt axis and cooperating with a pin inserted in the hole in an axially displaceable manner and having a length greater than the axial length of the through hole. The link portion adjacent the bolt end provided with the through hole is formed with an outwardly open recess into which the end of the pin protrudes.

This has the advantage that, instead of a polygonal head, only a through hole need be provided at the chain bolt and this can be formed substantially more easily and less expensively than a bolt head, if necessary together with the production of the second transverse hole to hold a cotter pin or the like. Moreover, the chain bolt according to the invention is distinguished over the prior art chain bolts in that it requires less material and has a lower weight.

It is still possible to rotate the chain bolt, when it has become worn on one side, from its previous position so that the correct geometrical supporting surfaces will face the chain bolt again at the supporting surfaces of the bearing bore in the connected forked portion.

For this purpose it is merely necessary, after the cotter pin or the like has been withdrawn from its hole, to slightly drive the chain bolt out of its bearing bore so that the pin in the through hole of the chain bore can be displaced along its axis. This results in the other end portion of the pin protruding from the through hole of the chain bolt whereupon the chain bolt need only be rotated so that the protruding pin portion can be placed into the recess of the outer forked portion by axially displacing the chain bolt back into the bearing bore.

It is here of advantage for the pin to have a profile corresponding to that of the through hole in the chain bolt.

According to a preferred embodiment of the invention, which further simplifies production, the through hole in the chain bolt has a cylindrical shape and is preferably arranged to extend diametrally relative to the bolt axis.

An advantageous and inventive feature of the abovedescribed embodiment is distinguished in that the end portions of the pin have an at least approximately hemispherical shape and preferably the length of the pin is greater by one-half the pin diameter than the length of the through hole in the bolt.

This provides automatic alignment of the pin in the through hole, for example when both end portions of the pin protrude beyond the bolt. This automatic adjustment is effected in that upon insertion of the pin into the recess in the forked portion or into one tine thereof, respectively, by axially displacing the chain bolt, one of the hemispherical end portions of the pin abuts on the edge of the chain bolt bearing bore and axially displaces the pin in the through hole.

A further feature of the above-described embodiment which simplifies production is characterized in that the recess in the one forked portion or in one tine of each joint connection is provided as a blind bore with a semicircular cross section and extending parallel to the chain bolt, the blind bore being open toward the bearing bore for the chain bolt in the forked portion or in one tine thereof, respectively.

This has the advantage that the recess can be produced easily and without requiring much time and materials, for example by cutting, in a single operating step.

BRIEF DESCRIPTION OF THE DRAWING

FIG. 1 is a partially broken-away side view of a forked link according to the invention.

FIG. 2 is a top view, partially in cross section of two forked links of the type shown in FIG. 1 connected together to form a joint in accordance with the invention.

FIG. 3 is a cross-sectional view along the section line III—III of FIG. 2.

FIG. 4a is a side elevational view of the joint shown in FIG. 4, taken in the direction of arrow A of FIG. 4.

FIG. 4 is a top view, partially in cross section of a chain link joint according to another embodiment of the invention.

DESCRIPTION OF THE PREFERRED EMBODIMENTS

FIGS. 1–3 show a structure in which the forked links of a link chain are each provided at one end with a fork 1 having two tines 2 and 3, and at the other end with a portion defining a bearing eye 4 which engages between the forked portions of an adjacent identical forked link.

Cylindrical bores 5 are provided in the tines 2 and 3 and in the bearing eye 4 through which one cylindrical chain bolt 6 is removably inserted at each chain link joint.

The chain bolt 6 is provided adjacent one end with a cylindrical through hole 7 whose axis is perpendicular to the axis of the bolt. A cylindrical pin 8 is axially displaceably disposed in hole 7. Pin 8 has a length which is greater than that of the through hole 7 by one-half the diameter of pin 8. Moreover, pin 8 is provided with hemispherical end portions 9 and 10, and is arranged so that one end portion 10 or 9, respectively, protrudes from the through hole 7, end portion 10 protruding in the illustration. This end portion 10 of the pin 8 is inserted into a recess 11 in the tine 2. Recess 11 has an approximately semicircular cross section and its longitudinal axis is arranged to be axially parallel to the bores 5 so that recess 11 can be produced economically, for example by cutting.

A transverse hole 12 is provided adjacent the other end of the chain bolt 6 and a cotter pin (not shown) is inserted through hole 12 in order to releasably fix the chain bolt 6 in the axial direction.

FIGS. 4 and 4a illustrate another embodiment in which recess 11 is disposed in the outer forked portion 13 of a link in order to accommodate the end portion 10 of the pin 8 which is provided to be axially displaceable in the through hole 7 of the chain bolt 6, while a cotter pin 15 is supported at the outside of the other outer forked portion 14 of the link, which cotter pin 15 is inserted through the transverse hole 12 of the chain bolt 6.

In correspondence with the forked link shown in FIGS. 1 to 3, the inner forked portion 16 is here provided merely with a bearing bore 5 through which the chain bolt 6 passes so that the inner forked portion 16 is hinged about the chain bolt 6 which is held in the outer forked portions 13 and 14 to be secured against rotation and axial displacement relative thereto.

It will be understood that the above description of the present invention is susceptible to various modifications, changes and adaptations, and the same are intended to be comprehended within the meaning and range of equivalents of the appended claims.

We claim:

1. In a chain composed of a plurality of links including: at least one forked portion having two parallel extending fork members provided with respective coaxial bores, at least one bearing eye portion provided with a bore coaxial with the bores in the forked portion, and a chain bolt extending through the bores in the forked portions and the bearing eye portion to hold those portions together, the chain bolt being secured against axial displacement and rotation relative to the forked portion, the improvement wherein: said chain bolt is provided at one of its ends with a through hole whose axis is transverse to the axis of said bolt; said chain bolt comprises a pin inserted in said hole in an axially displaceable manner and having a length greater by one-half its diameter than the axial length of said through hole; said fork member which is adjacent the end of said bolt provided with said through hole is formed with a recess which extends to that surface of said fork member which faces away from said other fork member and which communicates with the bore in its associated fork member; and when said bolt is fully inserted, one end portion of said pin protrudes from said bolt and engages in said recess.

2. A chain as defined in claim 1 wherein the cross-sectional profile of said pin corresponds to that of said through hole in said chain bolt.

3. A chain as defined in claim 2 wherein said through hole in said chain bolt is circular in cross section.

4. A chain as defined in claim 1 wherein said through hole extends across a diameter of the cross section of said chain bolt.

5. A chain as defined in claim 1 wherein the end portions of said pin are at least approximately hemispherical.

6. A chain as defined in claim 1 wherein said chain bolt further comprises means removably disposed at its other end to cooperate with said pin for preventing axial displacement of said bolt relative to said forked portion.

7. In a chain composed of a plurality of links including: at least one forked portion having two parallel extending fork members provided with respective coaxial bores, at least one bearing eye portion provided with a bore coaxial with the bores in the forked portion, and a chain bolt extending through the bores in the forked portions and the bearing eye portion to hold those portions together, the chain bolt being secured against axial displacement and rotation relative to the forked portion, the improvement wherein: said chain bolt is provided at one of its ends with a through hole whose axis is transverse to the axis of said bolt; said chain bolt comprises a pin inserted in said hole in an axially displaceable manner and having a length greater than the axial length of said through hole; said fork member which is adjacent the end of said bolt provided with said through hole is formed with a recess which extends to that surface of said fork member which faces away from said other fork member and which communicates with the bore in its associated fork member; said recess is in the form of a blind bore having a semicircular cross section and extending parallel to the axis of said chain bolt, said blind bore being open toward the bore in its associated member; and when said bolt is fully inserted, one end portion of said pin protrudes from said bolt and engages in said recess.

* * * * *